(12) United States Patent
Ching

(10) Patent No.: US 10,165,765 B1
(45) Date of Patent: Jan. 1, 2019

(54) SPEARGUN

(71) Applicant: George R. Ching, Eichenau (DE)

(72) Inventor: George R. Ching, Eichenau (DE)

( * ) Notice: Subject to any disclaimer, the term of this patent is extended or adjusted under 35 U.S.C. 154(b) by 0 days.

(21) Appl. No.: 15/638,476

(22) Filed: Jun. 30, 2017

(51) Int. Cl.
| | |
|---|---|
| F41B 7/04 | (2006.01) |
| A01K 81/00 | (2006.01) |
| F42B 6/02 | (2006.01) |
| F41B 11/83 | (2013.01) |
| F41B 3/00 | (2006.01) |
| F41B 7/00 | (2006.01) |
| F42B 6/00 | (2006.01) |

(52) U.S. Cl.
CPC .............. *A01K 81/00* (2013.01); *F41B 3/005* (2013.01); *F41B 7/04* (2013.01); *F41B 7/046* (2013.01); *F41B 11/83* (2013.01); *F42B 6/02* (2013.01); *F41B 7/00* (2013.01); *F42B 6/00* (2013.01)

(58) Field of Classification Search
CPC .......... F41B 3/005; F41B 5/12; F41B 5/1469; F41B 7/04; F41B 7/046
See application file for complete search history.

(56) References Cited

U.S. PATENT DOCUMENTS

| | | | | |
|---|---|---|---|---|
| 5,505,187 A * | 4/1996 | Troncoso | .............. | F41B 5/1469 124/35.2 |
| 5,749,348 A * | 5/1998 | Oviedo-Reyes | .......... | F41B 5/12 124/25 |
| 5,931,145 A * | 8/1999 | Oviedo-Reyes | .......... | F41B 5/12 124/20.3 |
| 8,434,463 B2 * | 5/2013 | Bednar | .................... | F41B 5/123 124/25 |
| 8,607,772 B2 * | 12/2013 | Barnett | ...................... | F41B 5/12 124/25 |
| 8,978,634 B2 * | 3/2015 | Darlington | ................ | F41B 5/12 124/25 |
| 9,291,421 B1 * | 3/2016 | Kempf | ....................... | F41B 5/12 |
| 9,523,549 B1 * | 12/2016 | Hughes | ..................... | F41B 5/12 |
| 9,599,426 B2 * | 3/2017 | Darlington | ................ | F41B 5/12 |
| 2016/0282080 A1 * | 9/2016 | Khoshnood | ............... | F41B 5/10 |
| 2017/0102205 A1 * | 4/2017 | Barnett | ..................... | F41B 5/12 |

* cited by examiner

*Primary Examiner* — John Ricci
(74) *Attorney, Agent, or Firm* — Grossman, Tucker, Perreault & Pfleger, PLLC

(57) ABSTRACT

The invention pertains to a speargun, comprising a barrel having an oblong body and a spear track for directly receiving a spear, the spear track being formed as a channel on the outer surface of the barrel, a handle unit connected to the barrel, and a trigger unit for releasing the spear through activation of a finger trigger, wherein the barrel is constructed as a single piece having an oblong barrel body comprising a hollow interior space, wherein a reinforcing bar is provided inside the hollow interior space, the reinforcing bar running essentially a length of the barrel body. The invention also pertains to a speargun wherein a housing containing the trigger unit has a window through which the trigger mechanism of the trigger unit is at least partly visible from an outside and a speargun wherein fixation means are provided for fixing the handle unit in different positions along the barrel.

15 Claims, 6 Drawing Sheets

SPEARGUN

FIELD OF THE INVENTION

The present invention relates to a speargun for speargun fishing.

BACKGROUND OF THE INVENTION

Spearguns are used underwater for firing a spear at fish or other targets. Although pneumatically driven spearguns are known, most common spearguns use elastic bands for accelerating the spear. Spearguns typically comprise a barrel, which, for example, has an oblong body and a spear track for directly receiving a spear. The spear track is usually formed as a channel on the outer surface of the barrel. The spear can be inserted into the spear track, which guides the spear while it is being accelerated by the elastic bands, for example, when the speargun is fired. Spearguns also typically comprise a handle unit which can, for example, comprise a handle and a finger trigger usually located in front of the handle. The handle unit is connected to the barrel. Spearguns are also typically provided with a trigger unit having a housing containing a trigger mechanism for releasing the spear through activation of the finger trigger. The trigger mechanism is usually used to fix the spear and the tensioned elastic band in place and to release them when the finger trigger is activated.

In spearguns of the type employing elastic bands for the acceleration of the spear, multiple elastic bands are typically used in a single speargun. As the elastic band or bands of the speargun have to be tensioned manually and underwater by the user of the speargun, the use of more than one elastic band facilitates loading of the speargun while multiple elastic bands can be used to collectively accelerate the spear with the necessary force. When the speargun is fully loaded, i.e. when the elastic bands are tensioned, the full elastic load of all the bands combined rests on the barrel, which needs to be sufficiently strong to withstand these forces. Especially with larger models of spearguns having very long barrels and multiple strong elastic bands, these forces can lead to bending or even breakage of the barrel.

The handle of the speargun is typically either in a position at the rear of the barrel or offset from the rear end of the barrel in the direction toward the middle of the barrel. Thus, there are either spearguns having their handle in a middle position or spearguns having the handle in a rear position. Both positions of the handle have different advantages and disadvantages in the handling of the speargun, for example when aiming at a target.

Another problem of conventional spearguns is that a lot of sand or other suspended solid particles are washed into the trigger mechanism, which is impossible to avoid. These solids can lead to a jamming of the trigger mechanism, which leads to a failure of the speargun when the user tries to fire. This can even be dangerous if the user tries to remove such a jam and accidentally sets off the tensioned elastic bands.

SUMMARY OF THE INVENTION

It is therefore an object of the present invention to solve or at least alleviate some of the problems of the prior art. For example, it is an object of the present invention to provide a speargun with a barrel that has an increased resistance to elastic loads. It is also an object of the present invention to provide a speargun with increased flexibility in and ease of use. Another object of the present invention is to decrease the risk of suspended solids jamming the trigger mechanism and to facilitate the removal of such jams. Finally, it is also an object of the present invention to provide a speargun with a pleasant and/or decorative appearance.

The object is achieved with a speargun according to any one of the independent claims. Further developments of the invention can be derived from the dependent claims.

Specifically, the object is achieved by a speargun comprising a barrel having an oblong body and a spear track for directly receiving a spear, the spear track formed as a channel on the outer surface of the barrel, a handle unit connected to the barrel, and a trigger unit for releasing the spear through activation of a finger trigger. The barrel is constructed as a single piece with a hollow interior space in the oblong body of the barrel. The barrel is provided with a reinforcing bar inside the interior space, the reinforcing bar running essentially the length of the body. The oblong body and the spear track of the barrel as well as the reinforcing bar inside the barrel are constructed together in a single process. As neither the spear track nor the reinforcing bar are separate parts that have to be fixed to the barrel, the barrel according to the present invention is very rigid and strong, withstanding even strong loads by multiple elastic bands. At the same time, the barrel can be produced very quickly and cost-effectively.

One of the main ideas of the present invention is that the spear track is formed as an integral part of the barrel. In the prior art, it is known to use conventional tube-shaped barrels with the spear track added on one side. In a construction like this, the wall thickness of the whole part comprising both the barrel and the spear track varies greatly. According to the invention, however, the wall thickness of the barrel is essentially the same on all sides of the barrel. Essentially in this case means that the wall thickness does not vary by more than 20%, preferably more than 15%, more preferably more than 10% and most preferably more than 5%. In a preferred embodiment of the invention, the wall thickness of the barrel varies by a maximum of 5-10%. It is preferred that the bottom of the spear track simultaneously forms a wall of the barrel that separates the hollow interior space of the barrel from the outside. In other words, the bottom surface of the spear track protrudes into the hollow interior space of the barrel in a convex shape. In a preferred embodiment, the barrel and the spear track have a drop-like shape with the spear track inserted into the drop from the narrow side or edge of the drop. The sides of the spear track are formed as straight-lined prolongations of the barrel wall. The described barrel geometry leads to a very light barrel using less material than in the prior art while simultaneously being rigid and strong enough to withstand great loads from the elastic bands. In a preferred embodiment, the barrel is constructed as an extrusion part. The barrel can thus be produced quickly and cost-effectively. It can be made from any suitable material, especially any suitable extrudable material, and preferably from a plastics material, most preferably from fiber-reinforced plastics.

The barrel is provided with a reinforcing bar inside the main body of the barrel. The reinforcing bar runs essentially along the whole length of the barrel. This means that the reinforcing bar is provided in the entire barrel except in places where the interior space of the barrel contains other elements or parts of other elements of the speargun. In one embodiment, for example, the barrel is provided with the reinforcing bar along its whole length, from one end of the barrel to the other. In another embodiment, various elements of the speargun may be attached to the barrel, for example, a nose, a handle base, a handle, the trigger mechanism and its housing or the like. Where these elements are attached to the barrel, there may be clearances in the reinforcing bar in the inside of the barrel to make room for these other elements or their attachment parts. It should be understood, however, that in the terms of the present invention, this still means that the reinforcing bar runs essentially along the whole length of the barrel. For example, the reinforcing bar may be provided along the entire length of the barrel except for clearances at one or both ends of the barrel. It is thus preferred that the reinforcing bar runs along at least 80%, preferably at least 85%, more preferably at least 90% and most preferably at least 95% of the entire barrel length. In a preferred embodiment of the invention, the reinforcing bar runs along 90-95% of the entire barrel length. The clearances are preferably formed after the barrel has been made with the reinforcing bar running along its entire length.

The reinforcing bar increases the resistance of the barrel to the loads created by the elastic bands. It is preferably constructed as an additional wall or septum inside the interior space of the barrel. The longitudinal axis of the reinforcing bar runs preferably in the direction of the longitudinal axis of the barrel. The reinforcing bar preferably spans from one side of the hollow interior space of the barrel to the other side in a direction perpendicular to the longitudinal axes of the reinforcing bar and the barrel. It is especially advantageous when the reinforcing bar is oriented to span the interior space of the barrel from the side of the spear track to the opposing side. When the spear track is oriented upwards the reinforcing bar preferably runs vertically (downwards from the bottom of the spear track) inside the hollow interior space of the barrel. In this way, the reinforcing bar offers maximum resistance against the loads from the elastic bands, which pull both along the longitudinal axis of the barrel as well as vertically upwards.

It is also possible to provide more than one reinforcing bar, for example two or three reinforcing bars. For example, two reinforcing bars can be provided adjacent and parallel to each other. In another example, two reinforcing bars can be provided orthogonally intersecting to each other. In cross-section, these reinforcing bars form the shape of a cross. In a preferred embodiment, only one reinforcing bar is provided, suitably dividing the interior space of the barrel into two equal halves, each half running essentially the length of the body of the barrel. It is preferred that the reinforcing bar is provided as a solid body without any holes or clearances. With regard to ease of manufacture, the barrel and reinforcing bar are preferably formed as one piece by extrusion.

The initially defined object of the present invention is also achieved by a speargun comprising a barrel, a handle unit connected to the barrel, and a trigger unit having a housing containing a trigger mechanism for releasing a spear through activation of a finger trigger. In this embodiment, the housing of the trigger unit has a window, through which the trigger mechanism of the trigger unit is at least partly visible from the outside. Typically, spearguns comprise a release catch, for example on the barrel, which retains the tensioned elastic bands. When the user activates a finger trigger, the movement of the finger trigger is transmitted to the release catch by a trigger mechanism. Specifically, the trigger mechanism causes the release catch to release the elastic bands, which then accelerate and fire the spear. The trigger mechanism is typically contained in a housing to protect it from outside interference and to make sure that larger floating solids or parts of the user's equipment cannot interfere with the trigger mechanism and cause a jam or premature firing. However, water can typically enter the housing of the trigger mechanism and therefore also suspended solids, like sand, can be washed into the housing and retained on the trigger mechanism. When too many solids accumulate in the housing, the trigger mechanism gets jammed. By the provision of a window in the housing of the trigger unit according to the invention, the user is able to at least partly see the trigger mechanism and also the amount of accumulated suspended solids. The user is therefore able to clear the solids from the trigger mechanism, for example by shaking the speargun so as to create a stream of water in the housing of the trigger unit which washes away the solids, before the trigger mechanism gets jammed. In the present invention, the window preferably comprises a transparent material which forms a part of the housing of the trigger unit. The trigger mechanism is therefore shielded from the outside by the window, while the user can still see the trigger mechanism through the window.

Generally, the trigger mechanism can be any kind of mechanical transmission which transmits the movement of the finger trigger to the release catch of the speargun. For example, the finger trigger itself could be used as a lever which pulls back the release catch and thereby releases the elastic bands. However, a finger trigger like this would be very hard to activate and therefore uncomfortable for the user. It is therefore preferred that the trigger mechanism comprises at least one transmission element for transmitting the movement of the finger trigger for the release of the spear, the at least one transmission element being visible from the outside through the window. The transmission element can be, for example, a lever or a gear which is used to relay the movement of the finger trigger. Because typically the movement of the at least one transmission element is jammed by accumulated solids, it is sufficient if the user can see this transmission element from outside through the window. It is therefore not necessary that every single part of the trigger mechanism is visible. In another preferred embodiment, the trigger mechanism comprises at least two or at least three transmission elements, with these transmission elements being visible from the outside through the window.

Typically, the transmission elements are levers or gears. Their shape has to be carefully designed for the transmission of the movement of the finger trigger to the release catch for the release of the elastic bands and the spear. Therefore, the shape of the transmission elements normally is technically inherent or predetermined. As the at least one transmission element according to the invention is visible from the outside, in a preferred embodiment, the at least one transmission element is formed as a decorative figure while, of course, still retaining its function. Specifically, the decorative figure preferably is a representation of one of a human or a humanoid, an animal or an animal-like shape, hunting or fishing equipment, a boat, a ship or other naval or nautical imagery, a letter, a number, or any part of the aforementioned forms.

The trigger unit itself can be provided on any suitable part of the speargun. Normally the trigger unit is provided in the vicinity of the handle unit. For example, it is possible that the trigger unit is provided on the side of the barrel where the handle unit is located. Alternatively, the trigger unit can be provided on the side of the barrel having the spear track. In yet another alternative, the trigger unit can be provided on one of the sides of the barrel adjacent the spear track or the handle unit. In an especially preferred embodiment, however, the trigger unit or at least the housing of the trigger unit containing the at least one transmission element is provided protruding from the rear end of the barrel. The window can then be provided on one side of the trigger unit, for example the left or the right side. It is also possible that more than one window is provided on the trigger unit, for example on both the right and left sides of the trigger unit. Alternatively, the trigger unit as a whole can be made transparent.

The object of the present invention as initially explained is also achieved by a speargun comprising a barrel, a handle unit comprising a handle and a finger trigger located in front of the handle, the handle unit being releasably connected to the barrel, and a trigger unit for releasing a spear through activation of the finger trigger, wherein fixation means are provided for fixing the handle unit in different positions along the barrel. For example, fixation means are provided both on the handle unit and the barrel. Preferably, the fixation means on the barrel provide different positions along the length of the barrel in which the handle unit can be fixed by an interaction of the fixation means on the barrel and the fixation means on the handle unit. By the provision of different positions along the barrel in which the handle unit can be fixed, the flexibility of the use of the speargun is increased, as the user can decide where the handle unit is to be fixed and can also adapt the position of the handle unit according to his or her own preference or present situation. For example, a screw with a grip can be provided on the barrel or the handle unit, with which the handle unit can be fastened on the barrel. A releasable snap-on connection or the like are also feasible.

The barrel of the speargun comprises a rear end, which is the end of the barrel that is closer to the user while the user aims at a target, and an opposing nose end, which is the end of the barrel with which the user points at a target when aiming. When firing, the spear exits the speargun at the nose end. Conventionally, there are spearguns with the handle unit in a rear position, wherein the handle unit is close to the rear end of the barrel, and spearguns wherein the handle unit is offset from the rear end of the barrel and closer to the nose end than in case of the spearguns having the handle unit in the rear position. In the present invention, the handle unit can generally be fixed in any position along the length of the barrel. In a preferred embodiment, the different positions comprise at least these known positions, i.e., a rear handle position closer to the rear end and a mid-handle position further away from the rear end, closer to the nose end. In contrast to the prior art spearguns the invention combines both fixing positions in one speargun. Accordingly, the user can remodel the speargun from a model with a rear handle position to a model with a mid-handle position.

In one embodiment of the present invention, fixation means for the handle unit are provided directly on the barrel itself. For example, the barrel is provided with protrusions or recesses which are designed to interact with corresponding fixation means on the handle unit. Alternatively or in addition, threaded and/or unthreaded bores for screws and/or bolts can be provided on the barrel, which are also designed to interact with fixation means on the handle unit. Preferably, the fixation means on the barrel and the fixation means on the handle unit form a form-fitting engagement. In another preferred embodiment, a handle base is provided on the barrel which in turn is provided with the fixation means for the handle unit. In this embodiment, the fixation means comprise first mounting elements provided on the handle unit and second mounting elements provided on the handle base provided on the barrel, the first and second mounting elements forming a form-fitting engagement. The handle base and the barrel can be constructed as a single piece or the handle base and the barrel can be separate pieces, in which case the handle base is fixed to the barrel. The handle base can also serve as a housing for a part of the trigger mechanism relaying the movement of the finger trigger to the release catch of the speargun. It is therefore advantageous if the handle unit along with the finger trigger is fixed on the handle base, so that the trigger mechanism can be connected to the finger trigger. The first mounting elements and the second mounting elements preferably form a form-fitting engagement in the direction of the longitudinal axis of the barrel. This means that undesired movement of the handle unit along the length of the barrel is prevented by the form-fitting engagement of the first mounting elements on the handle unit and the second mounting elements on the handle base. By engaging the first and second mounting elements, the handle unit is fixed in one of the different positions along the barrel.

It is possible that different, discrete positions along the barrel are provided in which the handle unit is fixable. This means that the barrel and/or the handle base are provided with fixation means or second mounting elements in these different positions so that the user can decide in which of these predetermined positions the handle unit is fixed. The user simply engages the first mounting elements on the handle unit with the second mounting elements in the specific position he or she wants to fix the handle unit in. In this way, multiple positions along the length of the barrel can be provided. In a preferred embodiment, two, three, four or five discrete positions along the length of the barrel are provided with second mounting elements for the fixation of the handle unit.

To further increase the flexibility of the speargun, in another preferred embodiment there are no predetermined discrete positions for the handle unit. Instead, the handle base and/or the barrel is provided with a guidance, and sliding means are provided for sliding the handle unit along the handle base and/or the barrel. The sliding means and guidance are preferably provided in a form-fitting engagement with each other which allows a sliding movement of the handle unit along the length of the barrel but prevents the handle unit from accidentally being removed from the barrel and/or the handle base. In this embodiment, the handle unit can be freely positioned in any position along the guidance of the handle base and/or the barrel. The guidance is therefore preferably provided along at least 10%, more preferably at least 20%, even more preferably at least 30% and most preferably at least 40%, of the length of the barrel. In a preferred embodiment, for example, the guidance is provided along 30% of the length of the barrel. The first mounting elements and the second mounting elements are preferably designed to engage in a force-fitting engagement, a friction lock or a form-fitting engagement preventing movement along the length of the barrel when the mounting elements are engaged. Preferably, the first mounting elements and the second mounting elements are designed as a quick-locking mechanism. This means that they can be released and locked by an underwater user using only one hand and preferably without needing any tools. In this way, the speargun according to the invention can be quickly adapted to the user's preference for any given situation.

To further increase user comfort, it is preferred that the handle is ergonomically formed for specifically either one of the right and the left hand of a user. The handle therefore has a grip that is specifically designed to be held with either the right or the left hand. For example, the handle is provided with grooves and ridges that are adapted to the specific form of the fingers of either a right or a left hand holding and using the speargun by the handle.

Especially in spearguns which employ multiple elastic bands for the acceleration of the spear, there can be an uncomfortable recoil of the speargun when firing. To alleviate this and also to steady the aim of a user, it is preferred if an arm brace is provided for releasably resting the speargun on an arm of the user. The arm brace is preferably fixed to at least one of the barrel, the handle base, the trigger unit and the handle unit. However, the arm brace has to be quickly disengageable from the arm of the user for security reasons, as spearguns may be provided with a reel and line and users might otherwise inadvertently be pulled downwards by diving targets pulling on the line. The arm brace is, in a preferred embodiment, provided between the handle unit and the rear end of the barrel. The arm brace is provided such that the user can hold the handle of the speargun and activate the finger trigger with the hand of the arm resting on the arm brace. Preferably, the arm brace is constructed such that it does not have any straps or latches that need to be closed to fix the arm on the brace. For example, the arm brace comprises a connection part with which the arm brace is connected to the speargun. The arm brace may be fixed to the barrel or the handle base on the side of the handle or may be fixed to the handle of the speargun by the connection part. It comprises two arms protruding from the connection part in the direction of the rear end and slanting away from the speargun. By the ends of the arms protruding away from the speargun, the two arms sustain a support for the arm of the user. The support is preferably made from flexible material like a synthetic fabric or rubber. It preferably spans from one arm of the brace to the other. The user can rest his arm against the support while holding the speargun by the handle for alleviating recoil and improved aiming accuracy. Additionally, the arm brace is expediently open in the direction away from the speargun so that the user can always quickly and easily disengage his or her arm from the brace. Specifically, the user does not need to open or disengage any kind of fixation means, like a strap, that fixes the arm to the speargun.

As the handle unit according to the invention can be fixed in different positions along the length of the barrel, it is preferred that the arm brace is constructed to be movable along the length of the barrel together with the handle unit. For example, the barrel and/or the handle base are provided with mounting elements pre-defining different positions in which the arm brace can be fixed with its connection part. The arm brace or its connection part can also be provided with sliding means so that it is slidable along the guidance of the handle base and/or the barrel along with the handle unit. Preferably the arm brace always keeps the same distance from the handle unit and the finger trigger in every one of the different positions of the handle unit and the arm brace on the barrel or the handle base. For the fixation of the arm brace on the barrel and/or the handle base, the same fixation means and techniques can be used as described in the present invention for the handle unit. To avoid repetitions, reference is therefore made to the explanations pertaining to the fixation of the handle unit in different positions along the barrel. The same kind of provisions as explained for the handle unit can be utilized for the arm brace. In a preferred embodiment, the arm brace is fixed to the handle unit and can be fixed in different positions or slided along the barrel of the speargun together with the handle unit as a single unit. In this embodiment, the arm brace is therefore fixed to the handle unit with its connection part so that the handle unit comprises the arm brace.

The present invention also pertains to any combination of the aforementioned features of the described spearguns. That is, any specific embodiment disclosed hereinbefore can be used in combination with any number of features of the other embodiments and/or the features explicitly mentioned in any of the independent claims as well as the dependent claims. For example, the speargun with a) the barrel constructed as an extruded single piece with a hollow interior space and a reinforcing bar inside the interior space can be provided with at least one of the features of b) a housing of the trigger unit having a window through which the trigger mechanism of the trigger unit is at least partly visible from the outside, c) fixation means for fixing the handle unit in different positions along the barrel and d) any number of features described as refinements and/or preferred embodiments. In addition, the invention encompasses any other possible combination of any number of features a), b), c) and d). Spearguns having these combinations or features are expressly incorporated as part of the present invention, and are not explicitly mentioned merely in order to avoid repetitions.

BRIEF DESCRIPTION OF THE DRAWINGS

The invention is now further explained with reference to the enclosed drawings. The drawings relate to specific embodiments of the present invention without the invention being restricted thereto. The drawings are merely schematic. In the figures.

DETAILED DESCRIPTION

Figure 1:
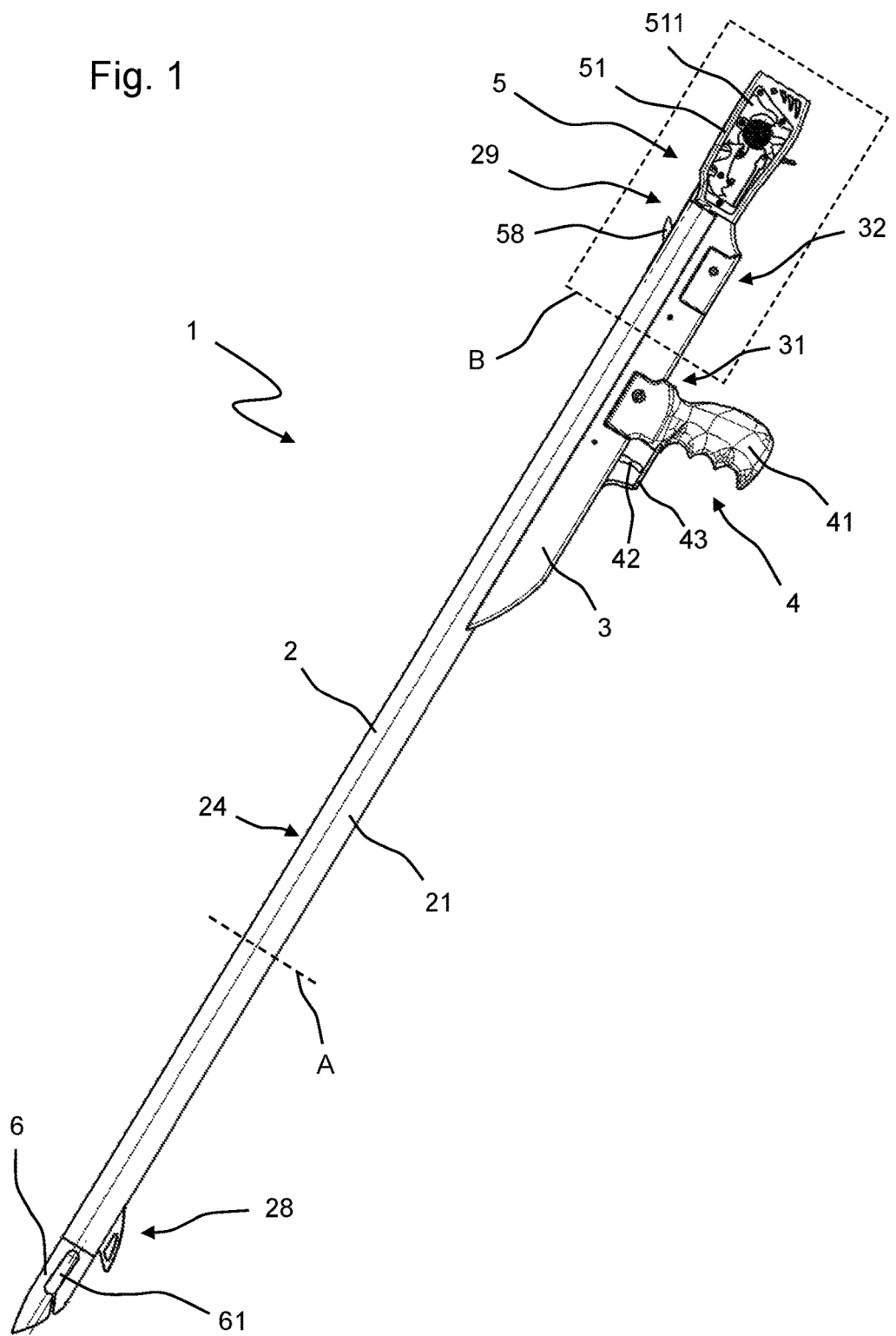
FIG. 1 shows a speargun according to one embodiment of the invention in a side view.

The features of the exemplary embodiments shown in the figures and explained hereafter can be combined with one another in the scope of the invention, if no technical contradiction results therefrom. Identical or functionally identical components are identified by the same reference numerals.

Figure 2:
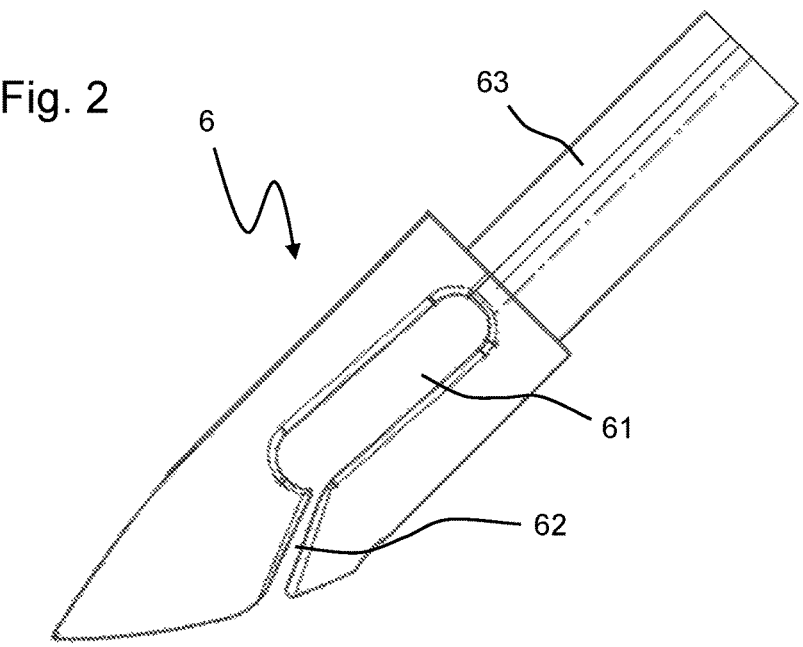
FIG. 2 shows the nose of the speargun of FIG. 1.

FIG. 1 shows an assembled speargun 1 according to an embodiment of the invention. The speargun 1 is essentially comprised of a barrel 2, a handle base 3, a handle unit 4, a trigger unit 5 and a nose 6. As shown in FIG. 2, the nose 6 comprises a connecting part 63 with which the nose 6 is fixed to the barrel 2. Specifically, the connecting part 63 is inserted into a hollow interior space at a front end, also called a nose end, 28 of the barrel 2 and then fixed in place. The nose 6 further comprises a retainer 61 into which elastic bands (not shown) can be threaded through a slot 62. To keep the elastic bands from inadvertently leaving the retainer 61 when they are not tensioned, the width of the slot 62 becomes narrower from the outside to the inside of the retainer 61. When the speargun 1 is used, the elastic bands threaded into the retainer 61 are tensioned to and hooked onto the release catch 58 at a rear end 29 of the barrel 2. The elastic bands are then tensioned from the nose 6 at the nose end 28 of the barrel 2 to the release catch 58 at the rear end 29. As will be described in more detail later, the speargun 1 can then be fired by a user by activation of a finger trigger 42. The finger trigger 42 is operatively connected to the release catch 58 by the trigger unit 5. Through activation of the finger trigger 42, the release catch 58 releases the elastic bands, which then contract and accelerate a spear (not shown).

Figure 3:
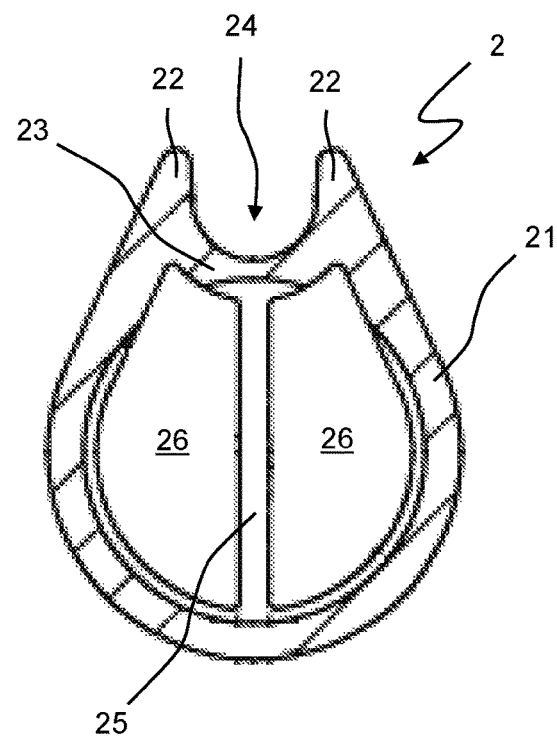
FIG. 3 shows a cross-section through the barrel of the speargun of FIG. 1.

FIG. 3 shows a cross-section of the barrel 2 at the position of the dashed line A in FIG. 1. The barrel 2 comprises an oblong body 21 having a hollow interior space 26. As shown in FIG. 3, the barrel 2 is integrally formed with the spear track 24, which is designed to receive a spear to be fired by the speargun 1. The barrel body 21 has a drop-like from in cross-section. On the side of the narrow end of the drop (at the top of the figure), a spear track 24 is formed as a channel or trough extending into the inside of the drop-like form. Specifically, the spear track 24 is defined by two protrusions 22 of the barrel body 21, which form rectilinear extensions of the barrel walls forming the body 21, and a track floor 23 which connects the protrusions 22 and acts both as a bottom of the spear track 24 and the wall of the barrel 2 on the side of the spear track 24.

In the example as shown in FIG. 3, the barrel 2 comprises a reinforcing bar 25 inside its hollow interior space 26, which spans from the side of the spear track 24, specifically from the track floor 23, to the opposing side of the barrel body 21. The reinforcing bar 25 is made from the same material as the body 21 of the barrel 2 and the spear track 24. It is preferably constructed together with the rest of the barrel 2 as a single piece. Most preferably, the barrel 2, including the spear track 24 and the reinforcing bar 25, is formed in the same production process by extrusion. Principally, any suitable extrudable material can be used for making the barrel. However, with respect to weight and stability, plastics and particularly fiber-reinforced plastics are most preferred. The wall thickness of the exterior walls of the barrel as well as the reinforcing bar are chosen with respect to the stability needed in the final product. The wall thickness can be the same in all parts of the barrel or may also be different, i.e., smaller in those places where less tension is exerted during use of the speargun.

The reinforcing bar 25, which, in this example, divides the hollow interior space 26 of the barrel 2 into two equal halves and runs essentially through the whole barrel 2 (apart from those places where it has been removed for fixing additional parts, such as the nose 6 or the trigger unit 5). With the reinforcing bar 25 according to the invention, the barrel 2 withstands even great loads by multiple elastic bands and reliably prevents the barrel 2 from being bent or broken. Simultaneously, as the geometry of the barrel 2 with the reinforcing bar 25 results in increased resistance against loads, the barrel 2 according to the invention can be constructed with less material and with thinner walls than the barrels of prior art, making the speargun 1 according to the invention significantly lighter. In prior art barrels, the spear track in usually put on the outer wall of the barrel, thus significantly adding to the wall thickness in this part of the barrel. In the present invention, the spear track is integrated into the overall structure of the barrel to the effect that its wall thickness can be made essentially uniform even in the region of the spear track 24. As a result, the design of the barrel 2 according to the invention provides rigid and robust barrels of very low weight.

Figure 4:
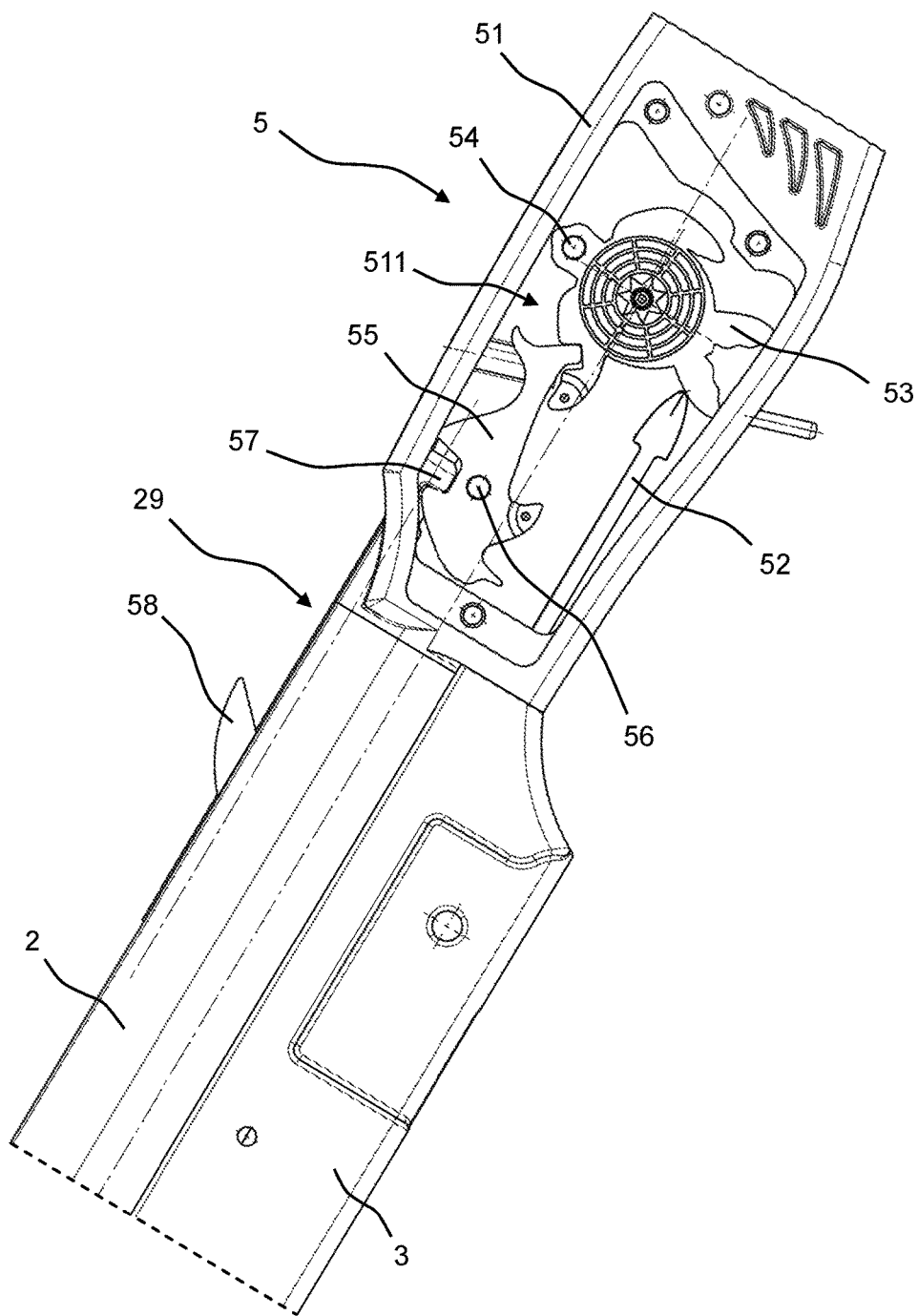
FIG. 4 shows parts of the trigger unit and trigger mechanism of FIG. 1.
Figure 5:
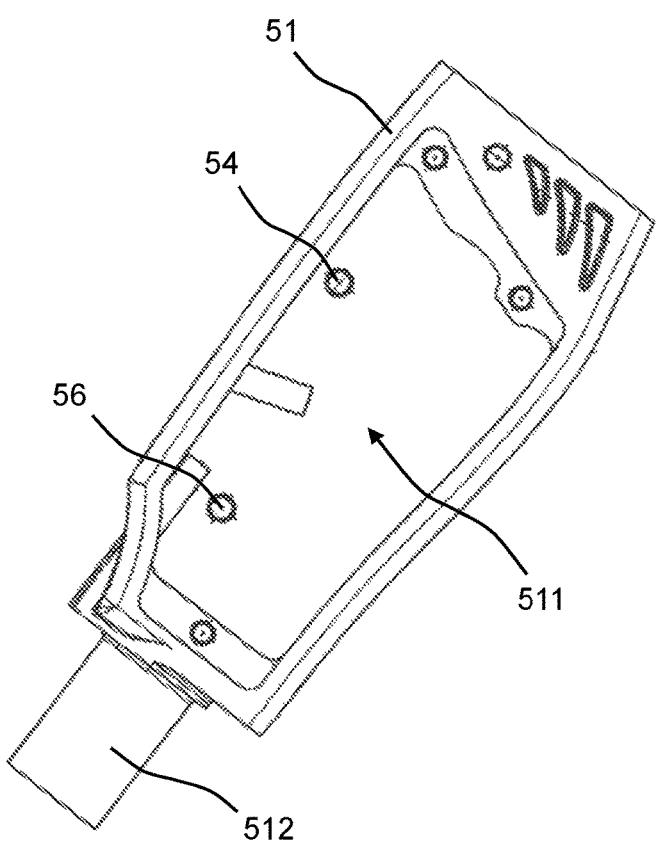
FIG. 5 shows parts of the trigger unit of FIG. 4 without the trigger mechanism.

As shown in FIG. 1, the trigger unit 5 of the speargun 1 is connected to the barrel 2 at the rear end 29 of the barrel 2. The trigger unit 5 will now be explained in more detail with reference to FIGS. 4 and 5. FIG. 4 represents an enlarged view of the box B as shown in FIG. 1. FIG. 5 shows the trigger unit 5 with the barrel 2 and the transmission elements of the trigger mechanism removed. The trigger unit 5 comprises a housing 51 having a connecting part 512 (see FIG. 5), which is inserted into the rear end 29 of the barrel 2 and then fixed in place. The housing 51 of the trigger unit 5 contains most of the trigger mechanism which is used to release the elastic bands from the release catch 58 through activation of the finger trigger 42. As shown in FIG. 4, for this purpose, the trigger mechanism comprises an actuator 52 which is operatively connected to the finger trigger 42 and which relays the movement of the finger trigger 42 by a user to a first lever or gear 53 which is rotatably connected to a first pivot 54 and which in turn relays the movement to a second lever or gear 55 which is rotatably connected to a second pivot 56. The second lever or gear 55 in turn releases a catch 57, which is connected to the release catch 58 and causes the release catch 58 to release the tensioned elastic bands and therefore fire the spear. The actuator 52, the first lever or gear 53 and the second lever or gear 55 as well as the catch 57 form the transmission elements of the trigger mechanism of the speargun 1 relaying activation of the finger trigger 42 to the release catch 58.

The housing 51 of the trigger unit 5 comprises a window 511 made from transparent or translucent material. The window 511 forms part of the housing 51 and separates and protects at least parts of the trigger mechanism from the outside. Simultaneously, the window 511 ensures that the parts of the trigger mechanism enclosed in the housing 51 are visible from the outside. A user can therefore look into the housing 51 from the outside through the window 511. The parts of the trigger mechanism in the housing can therefore be checked for possible sedimentation of solids like sand and the like without having to open the housing 51. An imminent jamming of the trigger mechanism of the speargun 1 can therefore be recognized early and prevented by the user removing the sediments. By providing a window 511 in the housing 51 of the trigger unit 5 according to the invention, a jamming of the speargun 1 by a clogging of the trigger mechanism can be reliably avoided.

Additionally, as there is a window 511 in the housing 51 of the trigger unit 5, this feature can be used to further increase the appearance of the speargun 1. This can be achieved by providing the trigger elements of the trigger mechanism of the trigger unit 5 in the form of decorative figures. In the shown example, the actuator 52 is shaped like a spear, the first lever or gear 53 is shaped like a turtle and the second lever or gear 55 is shaped like a dolphin. The spear-shaped actuator 52 is translationally moved by activation of the finger trigger 42 and pushes against a leg of the turtle-shaped first lever or gear 53, which causes the first lever or gear 53 to rotate about the pivot 54. The tail of the dolphin-shaped second lever or gear 55 is held in the arm of the turtle-shaped first lever or gear 53 and is pushed upwards and therefore also rotated by the rotating movement of the first lever or gear 53. The rotating movement of the second lever or gear 55 about the pivot 56 frees the catch 57 from a groove formed in the second lever or gear 55 and ultimately fires the spear. Of course, other shapes or forms can be used as decorative figures for the transmission elements of the trigger mechanism.

Next, the construction and functions of the handle base 3 and the handle unit 4 will be explained with reference to FIGS. 6a, 6b, and 7. In the shown embodiments, the handle base 3 is a separate part that is attached to the barrel 2. However, it is also possible to construct the barrel 2 and the handle base 3 as a single part. The handle base 3 is used as fixation and guidance means for the handle unit 4. The handle base 3 also houses part of the trigger mechanism, namely the parts connecting the finger trigger 42 with the actuator 52 and part of the actuator 52 itself. The handle unit 4 comprises a handle 41, the finger trigger 42 and a trigger protection 43. The handle 41 of the handle unit 4 is designed to correspond to the shape of either the right or the left hand of a user gripping the handle 41. The trigger protection 43 is designed to avoid an inadvertent movement of the finger trigger 42 and therefore an accidental firing of the speargun 1.

As shown in FIG. 1 and FIG. 6b, the handle base 3 provides fixation means for the handle unit 4 in both a mid-handle position 31 and a rear handle position 32. The rear handle position 32 is located closer to the rear end 29 of the barrel 2 of the speargun 1, while the mid handle position 31 is located offset from the rear end 29 of the barrel 2 and also from the rear handle position 32 in the direction toward the nose end 28 of the barrel 2. The handle base 3 is provided with mounting elements 37 in the mid handle position 31 and the rear handle position 32. The mounting elements 37 comprise recesses 33 and threaded bores 34 and are constructed to correspond to mounting elements 414 of the handle unit 4. The mounting elements 414 of the handle unit 4 are located on a connecting end 411 of the handle 41 and comprise mounting flanks 416 and a screw 412. As shown in FIG. 7, the mounting flanks 416 provide a handle base support 413 between them. Specifically, the mounting flanks 416 and the handle base support 413 are designed to correspond to the recesses 33 of the handle base 3. The handle unit 4 can therefore be inserted into the recesses 33 with the mounting flanks 416 and fixed in either one of the mid handle position 31 or the rear handle position 32 by fastening the screw 412. In this embodiment, the recess 33 and the mounting flanks 416 form a form-fitting engagement between the handle unit 4 and the handle base 3 which prevents movement of the handle 41 in the longitudinal direction of the speargun 1 or the barrel 2 or the handle base 3. The mounting elements 37 of the handle base 3 are identical in the mid handle position 31 and the rear handle position 32, so that the handle unit 4 can be fixed by a user in any one of these positions according to the preference of the user or the need of the current situation. The screw 412 is preferably constructed to be rotatable by hand without the use of a tool, for example by providing the screw 412 with wings which can be used to turn the screw 412. Even when underwater, the user can change the position of the handle unit 4 in this way.

Figure 6:
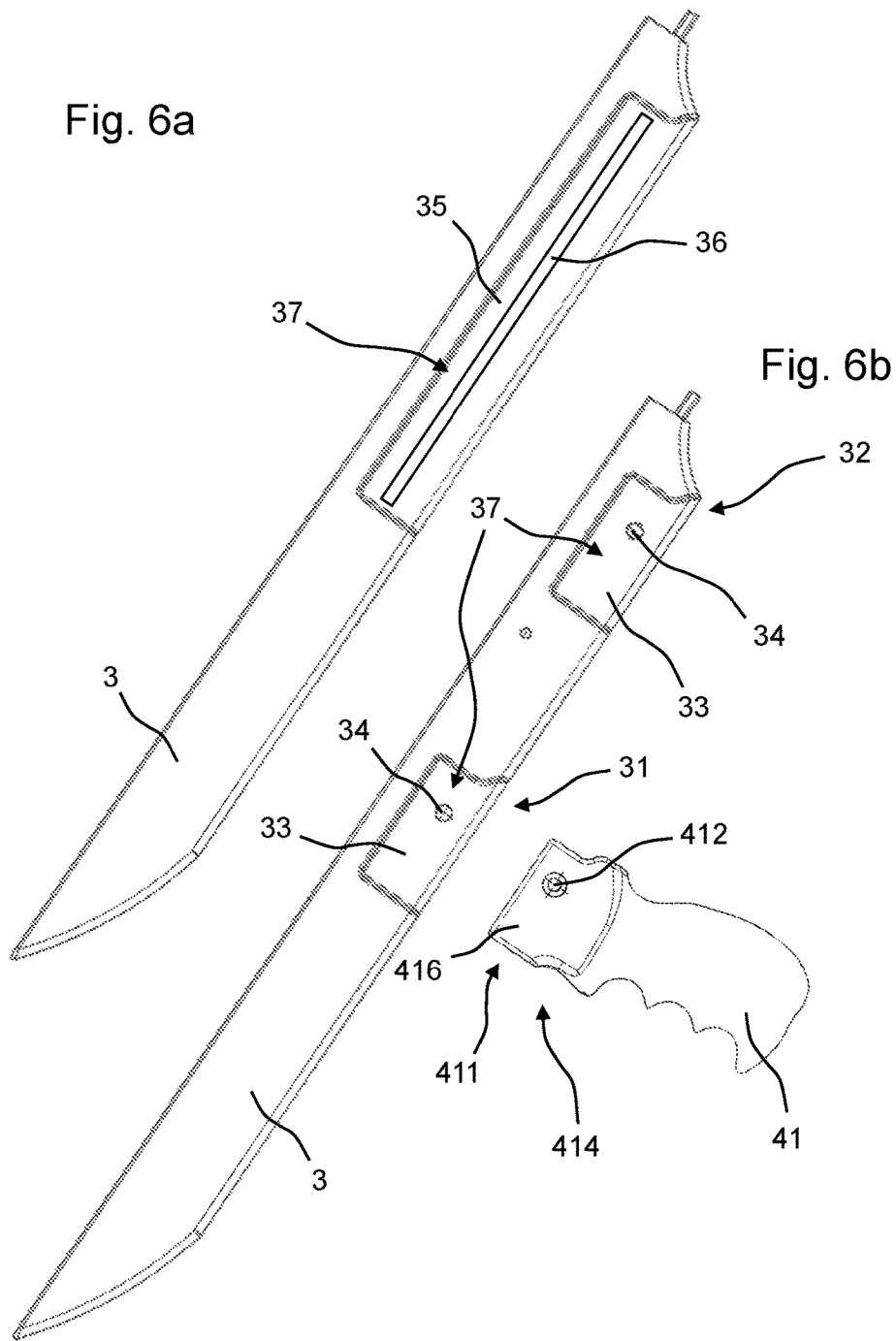
FIGS. 6*a* and 6*b* show different handle bases and a handle unit for use in the speargun of the invention.
Figure 7:
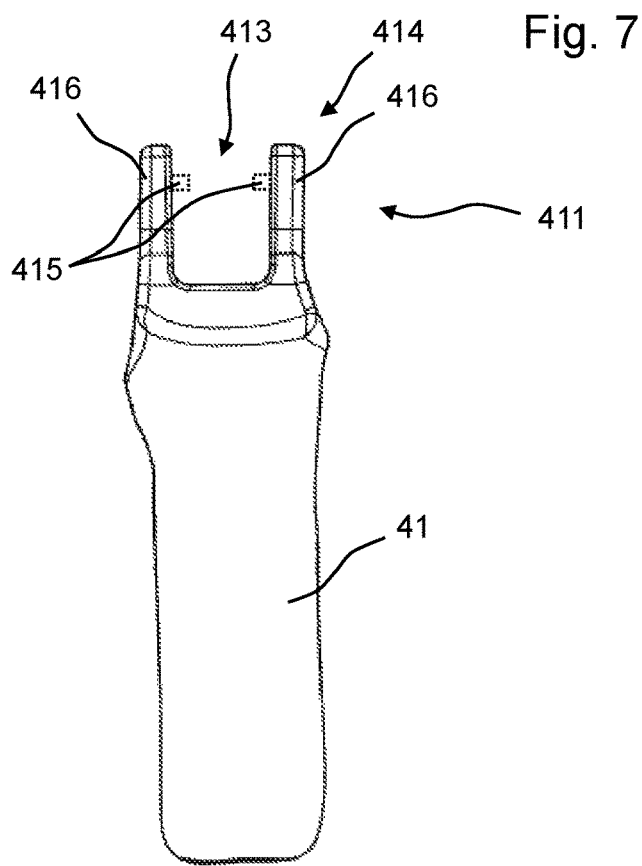
FIG. 7 shows the handle of FIG. 6 in a side view.

An alternative embodiment is shown in FIG. 6a. In this example, the handle base 3 comprises an elongated recess 35 which is constructed for sliding displacement of the handle unit 4. For this purpose, the handle base 3 comprises a guidance 36, which is, in the example of FIG. 6, provided in the recess 35. For this embodiment, the handle 41 of the handle unit 4 is provided with sliding means 415, which are, in the embodiment of FIG. 7, constructed as protrusions on the mounting flanks 416 of the handle 41. The sliding means 415 are constructed to correspond to the guidance 36 of the handle base 3, so that the sliding means 415 can be hooked into the guidance 36 so as to prevent unintended removal of the handle unit 4 from the handle base 3 but allow a movement of the handle unit 4 along the longitudinal axis of the speargun 1, the handle base 3 or the barrel 2 along the guidance 36 as provided on the handle base 3. Movement of the handle unit 4 along the guidance 36 can be stopped or prevented by the user fastening fixation means, for example the screw 412, which forms a force-fit or a friction lock with the guidance and/or the recess 35 of the handle base 3. In this embodiment, the user can fix the handle unit 4 in any position along the guidance 36 of the handle base 3, therefore giving the user the maximum in flexibility when choosing the position of the handle unit 4. The guidance 36 and the recess 35 are provided over a large enough part of the speargun 1 to comprise all typically used positions of the handle unit 4.

As the finger trigger 42 and the trigger protection 43 are movable together with the rest of the handle unit 4, the finger trigger 42 is provided with means to connect to the trigger mechanism in any position the user chooses to fix the handle unit 4 in. Preferably, the finger trigger 42 is designed to automatically connect to the trigger mechanism when the handle unit 4 is fixed in any position on the handle base 3. No manual connection of the finger trigger 42 to the trigger mechanism is therefore necessary and the user simply has to choose the position of the handle unit 4 without worrying about connecting the finger trigger 42. These quick coupling means enabling the finger trigger 42 to transmit its movement to the trigger mechanism can have any suitable form, such as, for example, a ratchet coupling, a friction clutch-type connection, a snap-on connection, or the like.

Figure 8:
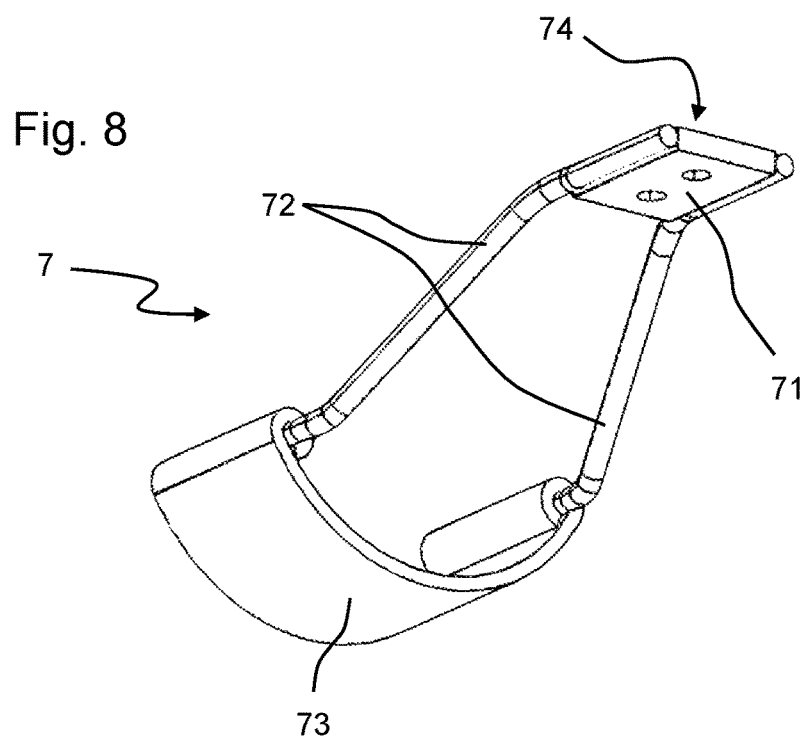
FIG. 8 shows an arm brace for use in the speargun of the invention.

FIG. 8 shows an arm brace 7 the speargun 1 according to the invention can optionally be provided with. In the figure, the arm brace 7 is shown in an isometric view that would correspond to a view from the side and from below the speargun 1 when the arm brace 7 is mounted to the speargun 1. The arm brace 7 comprises a connection part 71 and two arms 72 protruding from the connection part 71. The connection part 71 is used to connect the arm brace 7 to the speargun 1 from below. Between the ends of the arms 72 opposite the connection part 71, a support 73 is held. The support 73 is made from an elastic material like a fabric, preferably made from synthetic or plastic material, or a broad rubber band. The arm brace 7 further comprises a fixation side 74, which is the side of the connection part 71 which is directed towards the speargun 1 when the arm brace 7 is mounted. The arm brace 7 can be fixed to the speargun 1 with the fixation side 74 facing the speargun 1 in any position the user finds comfortable. When mounted, the connection part 71 is closer to the nose end 28 of the speargun 1 while the support 73 is closer to the rear end 29. In a preferred embodiment, the arm brace 7 is movable along with the handle unit 4. To this end, either the arm brace 7 is provided with the same fixation means as the handle unit 4, or the arm brace 7 is alternatively connected to the handle unit 4. Preferably, the connection part 71 is fixed to the handle unit 4 so that the arm brace 7 is a part of the handle unit 4. This means that the handle unit 4 and the arm brace 7 can be mounted and dismounted from the speargun 1 together as one unit, or alternatively, can be slidden along the guidance 36 together as one unit. When using the arm brace 7, the user can rest the speargun 1 on his or her arm through the support 73 without having to hold the full weight of the speargun 1 only by his hand holding the handle 41. Through the use of the arm brace 7, the comfort for the user is increased, especially when using multiple elastic bands for firing the spear, which can result in considerable recoil. By the use of the arm brace 7, such recoil can be comfortably absorbed using the whole arm of the user. The arm brace 7 according to the invention is also adapted to the safety needs of spear fishing, which means that the arm of the user only rests on the arm brace 7 without the latter being fixed to the arm. The user can simply remove his or her arm from the arm brace 7 at any time by letting go of the speargun 1. It is therefore ensured that the user cannot be pulled under by a diving target pulling on a line connected to the speargun 1.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicant's invention.

What is claimed is:

1. A speargun, comprising
    a barrel having an oblong body and a spear track for directly receiving a spear, the spear track being formed as a channel on the outer surface of the barrel,
    a handle unit connected to the barrel, and
    a trigger unit for releasing the spear through activation of a finger trigger,
wherein the barrel is constructed as a single piece having a hollow interior space in said oblong body of the barrel,
wherein the barrel is provided with a reinforcing bar inside said hollow interior space, the reinforcing bar running essentially a length of said barrel body, and
wherein the reinforcing bar is oriented to span said hollow interior space of said barrel from a side of the spear track to an opposing side.

2. The speargun according to claim 1, wherein the reinforcing bar divides said hollow interior space of said barrel into two equal halves, each half running essentially the length of said barrel body.

3. The speargun according to claim 1, wherein the barrel is constructed as an extrusion part.

4. A speargun, comprising
    a barrel,
    a handle unit connected to the barrel, and
    a trigger unit having a housing containing a trigger mechanism for releasing a spear through the activation of a finger trigger,
wherein said housing has a window through which the trigger mechanism of the trigger unit is at least partly visible from an outside, and
wherein the trigger unit is provided protruding from a rear end of the barrel.

5. The speargun according to claim 4, wherein the trigger mechanism comprises at least one transmission element for transmitting the movement of the finger trigger for release of the spear, the at least one transmission element being visible from the outside through said window.

6. The speargun according to claim 5, wherein said at least one transmission element is formed as a decorative figure.

7. A speargun, comprising
    a barrel,
    a handle unit comprising a handle and a finger trigger located in front of the handle,
    the handle unit being releasably connected to the barrel, and
    a trigger unit for releasing a spear through activation of the finger trigger,
wherein fixation means are provided for fixing the handle unit in different positions along a length of said barrel.

8. The speargun according to claim 7, wherein said different positions comprise at least a rear handle position closer to a rear end of the barrel and a mid-handle position further away from the rear end of the barrel.

9. The speargun according to claim 7, wherein said fixation means comprise first mounting elements provided on the handle unit and second mounting elements provided on a handle base provided on the barrel, the first and second mounting elements forming a form-fitting engagement.

10. The speargun according to claim 9, wherein the handle base is provided with a guidance, and sliding means are provided for sliding the handle unit along the handle base.

11. The speargun according to claim 7, wherein the handle is ergonomically formed for specifically either one of a right and a left hand of a user.

12. The speargun according to claim 7, wherein an arm brace is provided for releasably fixing the speargun to an arm of a user.

13. The speargun according to claim 12, wherein the arm brace is constructed to be movable along the length of the barrel together with the handle unit.

14. The speargun according to claim 7, comprising a barrel having an oblong body and a spear track for directly receiving a spear, the spear track being formed as a channel on the outer surface of the barrel; a handle unit connected to the barrel; and a trigger unit for releasing the spear through activation of a finger trigger;
    wherein the barrel is constructed as a single piece having a hollow interior space in said oblong body of the barrel, and
    wherein the barrel is provided with a reinforcing bar inside said hollow interior space, the reinforcing bar running essentially a length of said barrel body.

15. The speargun according to claim 7, wherein the trigger unit has a housing containing a trigger mechanism, wherein the housing of the trigger unit has a window through which the trigger mechanism of the trigger unit is at least partly visible from the outside.

* * * * *